US012378121B2

(12) United States Patent
Ram

(10) Patent No.: US 12,378,121 B2
(45) Date of Patent: Aug. 5, 2025

(54) HYBRID NANOMATERIALS, COMPOSITES THEREOF, AND USES THEREOF

(71) Applicant: University of South Florida, Tampa, FL (US)

(72) Inventor: Manoj Kumar Ram, Palm Harbor, FL (US)

(73) Assignee: University of South Florida, Tampa, FL (US)

( * ) Notice: Subject to any disclaimer, the term of this patent is extended or adjusted under 35 U.S.C. 154(b) by 1013 days.

(21) Appl. No.: 16/972,116

(22) PCT Filed: Jun. 7, 2019

(86) PCT No.: PCT/US2019/035925
§ 371 (c)(1),
(2) Date: Dec. 4, 2020

(87) PCT Pub. No.: WO2019/236933
PCT Pub. Date: Dec. 12, 2019

(65) Prior Publication Data
US 2021/0230004 A1    Jul. 29, 2021

Related U.S. Application Data

(60) Provisional application No. 62/681,876, filed on Jun. 7, 2018.

(51) Int. Cl.
*C01B 32/28* (2017.01)
*B82Y 40/00* (2011.01)
(Continued)

(52) U.S. Cl.
CPC ............ *C01B 32/28* (2017.08); *C01B 32/194* (2017.08); *C01B 32/198* (2017.08); *C08K 3/042* (2017.05); *B82Y 40/00* (2013.01); *C01B 2204/00* (2013.01); *C01P 2004/24* (2013.01); *C01P 2004/64* (2013.01); *C01P 2004/80* (2013.01); *C08K 2201/011* (2013.01)

(58) Field of Classification Search
CPC ..... C01B 32/28; C01B 32/194; C01B 32/198; C08K 3/042; C08K 2201/011; B82Y 40/00; C01P 2004/24
USPC ........................................................ 423/446
See application file for complete search history.

(56) References Cited

U.S. PATENT DOCUMENTS

| 6,428,189 | B1 | 8/2002 | Hochstein |
| 9,416,456 | B1 | 8/2016 | Ram |
| 2013/0165353 | A1 | 6/2013 | Mazyar et al. |

FOREIGN PATENT DOCUMENTS

CN    107758652 A    3/2018

OTHER PUBLICATIONS

PCT International Search Report and Written Opinion for PCT/US2019/035925 mailed on Aug. 19, 2019.
(Continued)

*Primary Examiner* — Anita Nassiri-Motlagh
(74) *Attorney, Agent, or Firm* — Quarles & Brady LLP; Yakov Sidorin; Margaret Robinson

(57) ABSTRACT

Described herein are hybrid nanomaterials that can include a functionalized nanodiamond and a functionalized graphene and/or functionalized graphene oxide. Also described herein are composite materials that can include a hybrid nanomaterial described herein and a polymer or polymeric material. Also described herein are methods of making and using the hybrid nanomaterials and composite materials described herein.

12 Claims, 9 Drawing Sheets

(51) Int. Cl.
   *C01B 32/194*   (2017.01)
   *C01B 32/198*   (2017.01)
   *C08K 3/04*     (2006.01)

(56) References Cited

OTHER PUBLICATIONS

Pill E et al., Optimization of Immobilization of Nanodiamonds on Graphene, IOP Conference Series: Materials Science and Engineering, vol. 80, 2015.
Department of Defense, Test Methods Standards, Microelectronics. In: Defense Do, editor. AMSC N/A FSC 59621997 p. 1-641.
Ghazvini M, et al. Heat transfer properties of nanodiamond-engine oil nanofluid in laminar flow. Heat Transfer Engineering. 2012;33(6):525-532.
Gomez H, et al. Novel Synthesis, Characterization, and Corrosion Inhibition Properties of Nanodiamond-Polyaniline Films. The Journal of Physical Chemistry C. 2010; 1 14(44):18797-804.
Huxtable ST, et al. Interfacial heat flow in carbon nanotube suspensions. Nature materials. 2003;2(1 1):731-4.
Kidalov SV, et al. Thermal conductivity of diamond composites. Materials. 2009;2(4):2467-95.
Molis S. Polyimides: Materials, Chemistry and Characterization edited by C Feger et al, Elsevier Science Publisher, Amsterdam. 1989.
Moore AL, et al. Emerging challenges and materials for thermal management of electronics. Materials Today. 2014; 17(4):163-74.
Ram MK, et al. Novel nanohybrid structured regioregular polyhexylthiophene blend films for photoelectrochemical energy applications. The Journal of Physical Chemistry C. 2011 ;1 15(44):21987-95.
Shahil KM, et al. Thermal properties of graphene and multilayer graphene: Applications in thermal interface materials. Solid State Communications. 2012;152(15):1331-40.
Shenogin S, et al. Effect of chemical functionalization on thermal transport of carbon nanotube composites. Applied Physics Letters. 2004;85(12):2229-31.
Stankovich S, et al. Graphene-based composite materials nature. 2006;442(7100):282-6.
Su Z, et al. Enhanced thermal conductivity of functionalized-graphene/boron nitride flexible laminated composite adhesive via a facile latex approach. Composites Part A: Applied Science and Manufacturing. 2017;99: 166-75.
Vityaz P, et al. Compaction of nanodiamonds produced under detonation conditions and properties of composite and polycrystalline materials made on their basis. Physics of the Solid State. 2004;46(4):764-6.
Wang J, et al. Super-compatible functional boron nitride nanosheets/polymer films with excellent mechanical properties and ultra-high thermal conductivity for thermal management. Journal of Materials Chemistry C. 2018.
Wang M, et al. Surface functionalization on the thermal conductivity of graphene-polymer nanocomposites. International Journal of Smart and Nano Materials. 2014; 5(2): 123-32.
Hou et al., Nanodiamond Decorated Graphene Oxide and the Reinforcement to Epoxy, Composites Science and Technology, 2018, 165:9-17.
Thanh et al., A Few-Layer Graphene-Graphene Oxide Composite Containing Nanodiamonds as Metal-Free Catalysts, Journal of Materials Chemistry A, 2014, 2:11349-11357.
European Patent Office, Extended Search Report, Application No. 19815517.8, Feb. 10, 2022, 10 pages.

HYBRID NANOMATERIALS, COMPOSITES THEREOF, AND USES THEREOF

CROSS-REFERENCE TO RELATED APPLICATION

This application is the 35 U.S.C. § 371 national stage application of International PCT Application No. PCT/US2019/035925, filed Jun. 7, 2019, which claims priority to and the benefit of U.S. Provisional Patent Application entitled "HYBRID NANOMATERIALS, COMPOSITES THEREOF, AND USES THEREOF", having Ser. No. 62/681,876, filed on Jun. 7, 2018, both of which are entirely incorporated herein by reference.

BACKGROUND

Thermal management is one of the most important considerations for high power systems.

The thermal management is very important for electronics at power-dense regions which produce "hot spots"—regions with wide temperature differences. The reliability of these electronics greatly depends on the heat dissipation of these hot spot regions. So, the composite polymer (epoxy, adhesive, etc.) have heat spreading capabilities which are more efficient in order to minimize the severity and influence of these hot spots in electronics packaging systems.

Polymers such as liquid crystal polymer (LCP), polyphenylene sulfide (PPS), polyether ether ketone (PEEK polysulfones., polyimide (PI), acrylonitrile butadiene styrene (ABS), polybutylene terephthalate (PBT), polycarbonate, nylon, polypropylene (PP), and polystyrene (PS) thermal plastic polymers, have low thermal conductivity so these require a filler with high thermal conducting values for enhancing the thermal conductivity of any composite polymeric material. The interfacial thermal conductance between polymer and fillers are a critical consideration in management of thermal transport in the composite materials. The use of carbon nanotubes, carbon fibers and graphene as filler materials has been found to enhance the thermal and electrical conducting properties of thermal polymer. However, carbon nanotubes having high thermal conductivity in addition as filler into the polymer could not enhance thermal conductivity of the composite due to poor coupling to the matrix material or to the contact surface.

The diamond promises one of the best materials for heat sink applications due to its thermal conductivity [up to 2,200 W/(m·K)]. However, the heat sink properties have not been exploited due to the high cost on nanodiamonds. Nanodiamond (ND), which has been produced using the detonation technique, has been proposed to show a high-level physical-mechanical and performance characteristics. The heat transfer properties of the nano-fluid containing nanodiamond have been shown in literature. Light emitting diode fixture designs have used nanodiamond thermal grease for the improved heat transfer purposes. The functionalization and composite formation of NDs with polymer is emerging rapidly due to electronic, mechanical and electrical properties. For example, Humberto et al have shown corrosion inhibitor characteristics of steel by composite film of made of nanodiamond-polyaniline. Photoelectrochemical properties of nanohybrid films containing regioregular polyhexyl-thiophene (RRPHTh) conducting polymer with ND nanoparticles have been observed. The heat sink property of ND with thermal polymer has not been yet been developed. Accordingly, there is a need to address the aforementioned deficiencies.

SUMMARY

In certain aspects according to the present disclosure, described herein are compositions. Compositions can comprise functionalized nanodiamond and a functionalized graphene and/or functionalized graphene oxide, wherein the functionalized nanodiamond and functionalized graphene and/or functionalized graphene oxide are attached via electrostatic interactions.

In embodiments according to the present disclosure, compositions as described herein can further comprise a polymer, wherein the polymer is attached to the functionalized nanodiamond, the functionalized graphene or the functionalized graphene oxide, or any combination thereof. The polymer can be low density polyethylene, high density polytetrafluoroethylene, polyvinyl chloride, polyethylene, polypropylene, poly(methyl methacrylate), acrylonitrile butadiene styrene polystyrenes, nylon, nylon 6, nylon 6,6, a polyamide, polyether ketone, a polysulfone, polylactic acid, a polyimide, a silicon polymer, a thermoplastic polyurethane, Poly-[2,2'-(m-phenylene)-5,5'-bisbenzimidazole]), a polycarbonate, a polyether sulfone, a fluoropolymer, polyoxymethylene, polyetheimide, polyphenylene oxide, silicon rubber, polyimide, polyamide, copolymers thereof, and any combination thereof.

In embodiments according to the present disclosure, the functionalized nanodiamond can be functionalized with a polycation. The polycation can be selected from the group consisting of: poly(ethyleneimine) (PEI), polydiallyldimethylammonium chloride (polyDADMAC), linear N, N-dodecyl, methyl-poly(ethyleneimine) (DMLPEI), poly (allylamine hydrochloride) (PAH), poly(N-methyl-ammonium iodide methylamine), polyamino(ethylvinylether) hydrochloride and combination(s) thereof.

In embodiments according to the present disclosure, the functionalized nanodiamond can be functionalized with a polycation. The polycation can be poly(ethyleneimine) (PEI), polydiallyldimethylammonium chloride (polyDADMAC), linear N, N-dodecyl, methyl-poly(ethyleneimine) (DMLPEI), poly (allylamine hydrochloride) (PAH), poly(N-methyl-ammonium iodide methylamine), polyamino(ethylvinylether) hydrochloride and combination(s) thereof.

In embodiments according to the present disclosure, compositions as described herein can comprise a functionalized graphene.

In embodiments according to the present disclosure, the functionalized graphene can be functionalized with a polyanion. The polyanion can be poly (styrene sulfonate), polyacrylic acid, polystyrene sulfonate and their salts, polymethacrylic acids and their salts, poly(dodecyl sulphonate), polydodecylbenzenesulfonate, and combinations thereof.

In embodiments according to the present disclosure, the functionalized graphene can be functionalized with a polyanion. The polyanion can be of poly (styrene sulfonate), polyacrylic acid, polystyrene sulfonate and their salts, polymethacrylic acids and their salts, poly(dodecyl sulphonate), polydodecylbenzenesulfonate, and combinations thereof.

In embodiments according to the present disclosure, the composition comprises a functionalized graphene oxide.

In embodiments according to the present disclosure, the functionalized graphene oxide can be functionalized with a polyanion. The polyanion can be poly (styrene sulfonate), polyacrylic acid, polystyrene sulfonate and their salts, polymethacrylic acids and their salts, poly(dodecyl sulphonate), polydodecylbenzenesulfonate, and combinations thereof. In embodiments according to the present disclosure, the functionalized graphene oxide can be functionalized with a polyanion. The polyanion can be selected from the group consisting of poly (styrene sulfonate), polyacrylic acid, polystyrene sulfonate and their salts, polymethacrylic acids and their salts, poly(dodecyl sulphonate), polydodecylbenzenesulfonate, and combinations thereof.

In embodiments according to the present disclosure, the composition can form a sheet.

The sheet that can be about 1 μm to about 2500 μm thick, about 100 μm to about 2400 μm thick, about 200 μm to about 2300 μm thick, about 300 μm to about 2200 μm thick, about 400 μm to about 2100 μm thick, about 500 μm to about 2000 μm thick, about 600 μm to about 1900 μm thick, about 700 μm to about 1800 μm thick, about 700 μm to about 1700 μm thick, about 800 μm to about 1600 μm thick, about 900 μm to about 1500 μm thick, about 1000 μm to about 1400 μm thick, about 1100 μm to about 1300 μm thick, or about 1200 μm thick.

The surface area of the sheet can be at least about 1 $cm^2$ to about 100 $cm^2$, about 10 $cm^2$ to about 90 $cm^2$, about 20 $cm^2$ to about 80 $cm^2$, about 30 $cm^2$ to about 70 $cm^2$, about 40 $cm^2$ to about 60 $cm^2$, or about 50 $cm^2$.

The thermal conductivity of compositions as described herein can be greater than about 8 W/mK.

The thermal conductivity of compositions as described herein can be about 1 to about 10 W/mK, about 2 to about 9 W/mK, about 3 to about 8 W/mK, about 4 to about 7 W/mK, or about 5 to about 6 W/mK.

In certain aspects of the present disclosure, also described herein are methods. Methods as described herein can comprise functionalizing a nanodiamond forming a functionalized nanodiamond; functionalizing graphene or graphene oxide forming a functionalized graphene or functionalized graphene oxide; and reacting the functionalized nanodiamond and the functionalized graphene or functionalized graphene oxide to form a hybrid nanomaterial.

Also described herein are methods. Methods as described herein can further comprise the step of reacting the hybrid nanomaterial with a polymer to form a composite nanomaterial. The polymer can be selected from the group consisting of: low density polyethylene, high density polytetrafluoroethylene, polyvinyl chloride, polyethylene, polypropylene, poly(methyl methacrylate) (PMMA), acrylonitrile butadiene styrene polystyrenes, nylon, nylon 6, nylon 6,6, a polyamide, polyether ketone, a polysulfone, polylactic acid, a polyimide, a silicon polymer, a thermoplastic polyurethane, Poly-[2,2'-(m-phenylene)-5,5'-bisbenzimidazole]), a polycarbonate, a polyether sulfone, a fluoropolymer, polyoxymethylene, polyetheimide, polyphenylene oxide, silicon rubber, polyimide, polyamide, copolymers thereof, and any combination thereof.

In embodiments according to the present disclosure, the polymer can be an adhesive or a paste.

In embodiments according to the present disclosure, the step of functionalizing the nanodiamond can comprise treating the nanodiamond with a polycation or a polyanion. The polycation can be poly(ethyleneimine) (PEI), polydiallyldimethylammonium chloride (polyDADMAC), linear N, N-dodecyl, methyl-poly(ethyleneimine) (DMLPEI), poly (allylamine hydrochloride) (PAH), poly(N-methyl-ammonium iodide methylamine), polyamino(ethylvinylether) hydrochloride and combination(s) thereof and the polyanion is selected from the group consisting of poly (styrene sulfonate), polyacrylic acid, polystyrene sulfonate and their salts, polymethacrylic acids and their salts, poly(dodecyl sulphonate), polydodecylbenzenesulfonate, and combinations thereof.

In embodiments according to the present disclosure, the step of functionalizing the graphene or graphene oxide can comprise treating the graphene or graphene oxide with a polycation or a polyanion. The polycation can be selected from the group consisting of: poly(ethyleneimine) (PEI), polydiallyldimethylammonium chloride (polyDADMAC), linear N, N-dodecyl, methyl-poly(ethyleneimine) (DMLPEI), poly (allylamine hydrochloride) (PAH), poly(N-methyl-ammonium iodide methylamine), polyamino(ethylvinylether) hydrochloride and combination(s) thereof and the polyanion is selected from the group consisting of poly (styrene sulfonate), polyacrylic acid, polystyrene sulfonate and their salts, polymethacrylic acids and their salts, poly (dodecyl sulphonate), polydodecylbenzenesulfonate, and combinations thereof.

Also described herein are devices comprising any composition or combination of compositions as described herein.

BRIEF DESCRIPTION OF THE DRAWINGS

Further aspects of the present disclosure will be readily appreciated upon review of the detailed description of its various embodiments, described below, when taken in conjunction with the accompanying drawings.

FIG. 8 shows this nanocomposite formed with polyimide.

DETAILED DESCRIPTION

Figure 1:
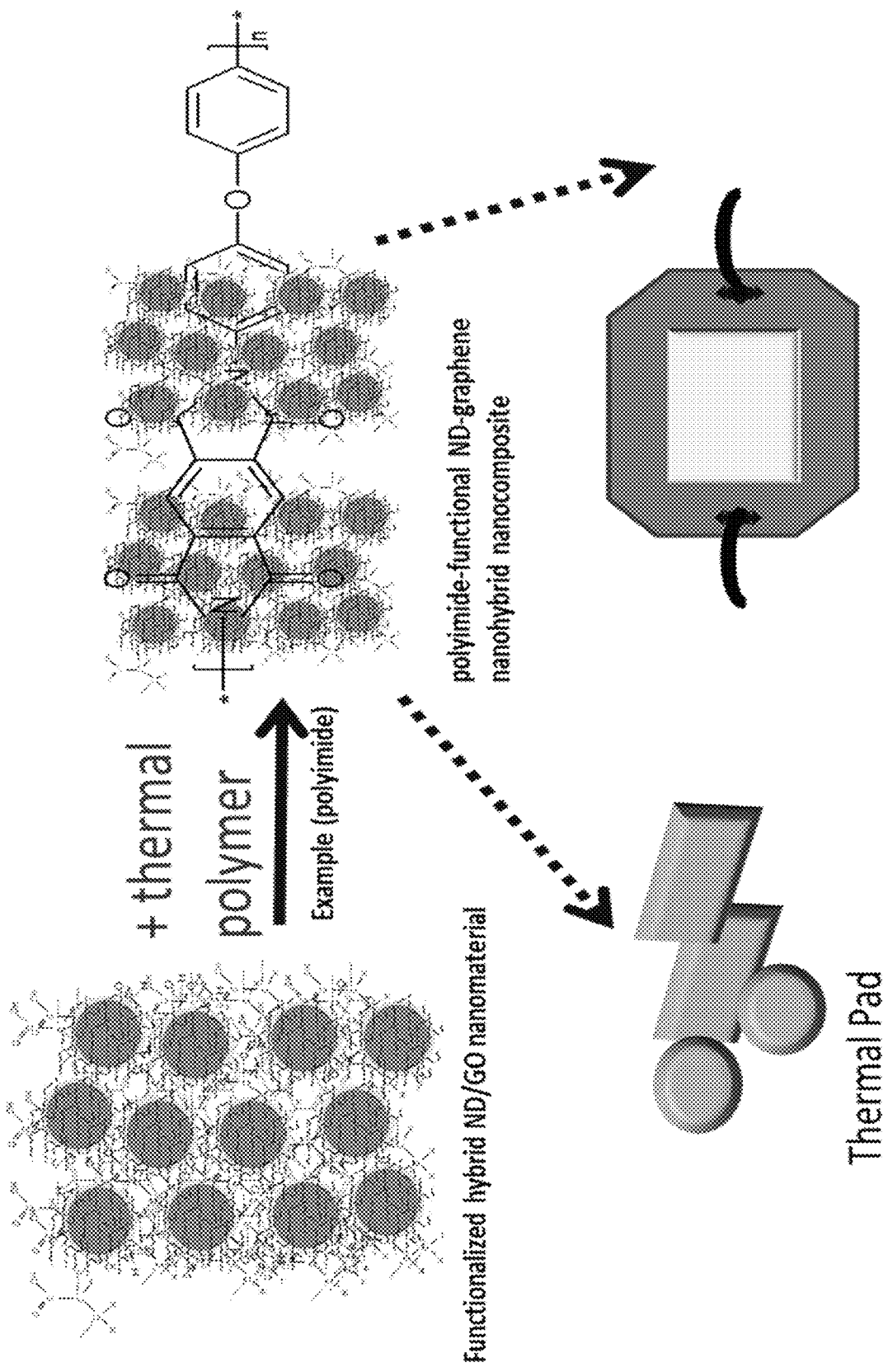
FIG. 1 shows a schematic of the hybrid synthesized material, composites thereof, and uses thereof.

Before the present disclosure is described in greater detail, it is to be understood that this disclosure is not limited to particular embodiments described, and as such may, of course, vary. It is also to be understood that the terminology used herein is for the purpose of describing particular embodiments only, and is not intended to be limiting.

Where a range of values is provided, it is understood that each intervening value, to the tenth of the unit of the lower limit unless the context dearly dictates otherwise, between the upper and lower limit of that range and any other stated or intervening value in that stated range, is encompassed within the disclosure. The upper and lower limits of these smaller ranges may independently be included in the smaller ranges and are also encompassed within the disclosure, subject to any specifically excluded limit in the stated range. Where the stated range includes one or both of the limits, ranges excluding either or both of those included limits are also included in the disclosure.

Unless defined otherwise, all technical and scientific terms used herein have the same meaning as commonly understood by one of ordinary skill in the art to which this disclosure belongs. Although any methods and materials similar or equivalent to those described herein can also be used in the practice or testing of the present disclosure, the preferred methods and materials are now described.

All publications and patents cited in this specification are cited to disclose and describe the methods and/or materials in connection with which the publications are cited. All such publications and patents are herein incorporated by references as if each individual publication or patent were specifically and individually indicated to be incorporated by reference. Such incorporation by reference is expressly limited to the methods and/or materials described in the cited publications and patents and do not extend to any lexicographical definitions from the cited publications and patents. Any lexicographical definition in the publications and patents cited that is not also expressly repeated in the instant application should not be treated as such and should not be read as defining any terms appearing in the accompanying claims. The citation of any publication is for its disclosure prior to the filing date and should not be construed as an admission that the present disclosure is not entitled to antedate such publication by virtue of prior disclosure. Further, the dates of publication provided could be different from the actual publication dates that may need to be independently confirmed.

As will be apparent to those of skill in the art upon reading this disclosure, each of the individual embodiments described and illustrated herein has discrete components and features which may be readily separated from or combined with the features of any of the other several embodiments without departing from the scope or spirit of the present disclosure. Any recited method can be carried out in the order of events recited or in any other order that is logically possible.

Embodiments of the present disclosure will employ, unless otherwise indicated, techniques of molecular biology, microbiology, organic chemistry, biochemistry, physiology, cell biology, cancer biology, and the like, which are within the skill of the art. Such techniques are explained fully in the literature.

Definitions

As used herein, As used herein, "about," "approximately," and the like, when used in connection with a numerical variable, can generally refers to the value of the variable and to all values of the variable that are within the experimental error (e.g., within the 95% confidence interval for the mean) or within +/−10% of the indicated value, whichever is greater.

The term "copolymer" as used herein, generally refers to a single polymeric material that is comprised of two or more different monomers. The copolymer can be of any form, such as random, block, graft, etc. The copolymers can have any end-group, including capped or acid end groups.

The term "molecular weight", as used herein, can generally refer to the mass or average mass of a material. If a polymer or oligomer, the molecular weight can refer to the relative average chain length or relative chain mass of the bulk polymer. In practice, the molecular weight of polymers and oligomers can be estimated or characterized in various ways including gel permeation chromatography (GPC) or capillary viscometry. GPC molecular weights are reported as the weight-average molecular weight ($M_w$) as opposed to the number-average molecular weight ($M_n$). Capillary viscometry provides estimates of molecular weight as the inherent viscosity determined from a dilute polymer solution using a particular set of concentration, temperature, and solvent conditions.

Discussion

Thermal management is one of the most important considerations for high power systems. The thermal management is very important for electronics at power-dense regions which produce "hot spots"—regions with wide temperature differences. The reliability of these electronics greatly depends on the heat dissipation of these hot spot regions. So, the composite polymer (epoxy, adhesive, etc.) have heat spreading capabilities which are more efficient in order to minimize the severity and influence of these hot spots in electronics packaging systems. Polymers such as liquid crystal polymer (LCP), polyphenylene sulfide (PPS), polyether ether ketone (PEEK polysulfones., polyimide (PI), acrylonitrile butadiene styrene (ABS), polybutylene terephthalate (PBT), polycarbonate, nylon, polypropylene (PP), and polystyrene (PS) thermal plastic polymers, have low thermal conductivity so these require a filler with high thermal conducting values for enhancing the thermal conductivity of any composite polymeric material. The interfacial thermal conductance between polymer and fillers are a critical consideration in management of thermal transport in the composite materials. The use of carbon nanotubes, carbon fibers and graphene as filler materials has been found to enhance the thermal and electrical conducting properties of thermal polymer. However, the functionalization is one of the key factors to enhance the thermal conductivity in graphene/polymer, carbon nanotube/polymer; graphene/boron nitride laminated composite, boron nitride nanosheets/polymer films etc. The carbon nanotube having high thermal conductivity in addition as filler into the polymer could not enhance thermal conductivity of the composite due to poor coupling to the matrix material or to the contact surface. The thermal boundary resistance of the polymer matrix with carbon nanotubes has been found to as high as $10^{-7}$ $m^2$ K/W. Thus, the chemical functionalization of filler also increases the magnitude of thermal conductivity of the composite materials. The thermal conductivity of graphene is in the range of around 3000 W/mK, and has been extensively used with polymer (polystyrene, epoxy resin etc.) to form composite, however it also increases the electrical conductivity up to 0.1 S/cm of the composite material.

The diamond promises one of the best materials for heat sink applications due to its thermal conductivity [up to 2,200 W/(m·K)]. However, the heat sink properties have not been exploited due to the high cost on nanodiamonds. Nanodiamond (ND), which has been produced using the detonation technique, has been proposed to show a high-level physical-mechanical and performance characteristics. The heat transfer properties of the nano-fluid containing nanodiamond have been shown in literature. Light emitting diode fixture designs have used nanodiamond thermal grease for the improved heat transfer purposes. The functionalization and composite formation of NDs with polymer is emerging rapidly due to electronic, mechanical and electrical properties. For example, Humberto et al have shown corrosion inhibitor characteristics of steel by composite film of made of nanodiamond-polyaniline. Photoelectrochemical properties of nanohybrid films containing regioregular polyhexylthiophene (RRPHTh) conducting polymer with ND nanoparticles have been observed. The heat sink property of ND with thermal polymer has not been yet been developed.

With that said, described herein hybrid nanodiamond/graphene and/or graphene oxide nanomaterials and composite materials that can include the hybrid nanodiamond/graphene and/or graphene oxide nanomaterial and a polymer. Also described herein are devices that can include the hybrid nanomaterials and/or composite materials described herein. Also described herein are methods of making the hybrid nanomaterials and composite materials described herein. Uses and applications of the hybrid nanomaterials and/or the composite materials described herein are described. Other compositions, compounds, methods, features, and advantages of the present disclosure will be or become apparent to one having ordinary skill in the art upon examination of the following drawings, detailed description, and examples. It is intended that all such additional compositions, compounds, methods, features, and advantages be included within this description, and be within the scope of the present disclosure.

Hybrid Nanomaterials and Composite Materials Containing the Hybrid Nanomaterials Described herein are hybrid nanomaterials that can include a functionalized nanodiamond, a functionalized graphene and/or functionalized graphene oxide, where the functionalized nanodiamond and functionalized graphene, and/or functionalized graphene oxide can be attached via electrostatic interactions. The functionalized nanodiamond can be functionalized with a polycation or a polyanion. The polycation can be poly (ethyleneimine) (PEI), polydiallyldimethylammonium chloride (polyDADMAC), linear N, N-dodecyl, methyl-poly (ethyleneimine) (DMLPEI), poly (allylamine hydrochloride) (PAH), poly(N-methyl-ammonium iodide methylamine), polyamino(ethylvinylether) hydrochloride and any combination(s) thereof. The polyanion can be poly (styrene sulfonate), polyacrylic acid, polystyrene sulfonate and their salts, polymethacrylic acids and their salts, poly (dodecyl sulphonate), polydodecylbenzenesulfonate, and any combination(s) thereof.

The functionalized graphene can be functionalized with a polyanion or a polycation. The polycation can be polyethyleneimine. The polycation can be poly(ethyleneimine) (PEI), polydiallyldimethylammonium chloride (polyDADMAC), linear N, N-dodecyl, methyl-poly(ethyleneimine) (DMLPEI), poly (allylamine hydrochloride) (PAH), poly(N-methyl-ammonium iodide methylamine), polyamino(ethylvinylether) hydrochloride and any combination(s) thereof. The polyanion can be poly (styrene sulfonate), polyacrylic acid, polystyrene sulfonate and their salts, polymethacrylic acids and their salts, poly(dodecyl sulphonate), polydodecylbenzenesulfonate, and any combination(s) thereof.

The functionalized graphene oxide can be functionalized with a polyanion. The polyanion can be poly (styrene sulfonate), polyacrylic acid, polystyrene sulfonate and their salts, polymethacrylic acids and their salts, poly(dodecyl sulphonate), polydodecylbenzenesulfonate, and any combination(s) thereof.

The hybrid nanomaterial can be attached to or included in a polymer to form a hybrid composite material. The polymer can be attached to the functionalized nanodiamond, the functionalized graphene, the functionalized graphene oxide, or any combination thereof. The polymer can form a matrix. The polymer can be an epoxy. The composite material can form or be included in an adhesive. The composite material can form or be included in a paste. The polymer can be selected from the group of: low density polyethylene (LDP), high density polyethylene (HDP), polytetrafluoroethylene, polyvinyl chloride, polyethylene, polypropylene, poly(methyl methacrylate), acrylonitrile butadiene styrene polystyrenes, nylon, nylon 6, nylon 6,6, a polyamide, polyether ketone, a polysulfone, polylactic acid, a polyimide, a silicon polymer, a thermoplastic polyurethane, Poly-[2,2'-(m-phenylene)-5,5'-bisbenzimidazole]), a polycarbonate, a polyether sulfone, a fluoropolymer, polyoxymethylene, polyetheimide, polyphenylene oxide, copolymers thereof, and any combination thereof.

The hybrid nanomaterial and/or the composite materials described herein can be sheets. The sheet can be about 1 μm to about 2500 μm thick. The sheet can have an area ranging from about 1 cm$^2$ to about −100 cm$^2$. The thermal conductivity of the hybrid nanomaterial and/or the composite material described herein can be greater than about 8 W/mK. The thermal conductivity of the hybrid nanomaterial and/or the composite material described herein can be about 1 to about 10 W/mK Methods of Making the Hybrid Nanomaterials and Composite Materials Containing the Hybrid Nanomaterials Described herein are methods of making the hybrid nanomaterials and composite materials containing the hybrid nanomaterials described herein. The method can include functionalizing a nanodiamond to form a functionalized nanodiamond, functionalizing graphene and/or graphene oxide to form a functionalized graphene and/or functionalized graphene oxide, and reacting the functionalized nanodiamond and the functionalized graphene and/or functionalized graphene oxide to form a hybrid nanomaterial. The method can also further include the step of reaction of the hybrid nanomaterial with a polymer to form a composite material. The polymer can be selected from the group of: polyethylene (LDP), high density polyethylene (HDP), polyvinyl chloride, polyethylene, polypropylene, poly(methyl methacrylate), acrylonitrile butadiene styrene polystyrenes, nylon, nylon 6, nylon 6,6, a polyamide, polyether ketone, a polysulfone, polylactic acid, a polyimide, a silicon polymer, a thermoplastic polyurethane, Poly-[2,2'-(m-phenylene)-5,5'-bisbenzimidazole]), a polycarbonate, a polyether sulfone, a fluoropolymer, polyoxymethylene, polyetheimide, polyphenylene oxide, copolymers thereof, and any combination thereof. The polymer can be an adhesive or a paste.

The step of functionalizing the nanodiamond can include treating the nanodiamond with a polycation or a polyanion. The polycation can be poly(ethyleneimine) (PEI), polydiallyldimethylammonium chloride (polyDADMAC), linear N, N-dodecyl, methyl-poly(ethyleneimine) (DMLPEI), poly (allylamine hydrochloride) (PAH), poly(N-methyl-ammonium iodide methylamine), polyamino(ethylvinylether) hydrochloride and any combination(s) thereof.

The polyanion can be poly (styrene sulfonate), polyacrylic acid, polystyrene sulfonate and their salts, polymethacrylic acids and their salts, poly(dodecyl sulphonate), polydodecylbenzenesulfonate, and any combination(s) thereof. The graphene oxide can be formed from graphene by treating graphene with an acid, such as concentrated sulfuric acid so to oxidize the graphene to from graphene oxide. The graphene oxide can be formed by treating graphene with oxygen at high temperatures to form graphene oxide. Graphene can be carboxylated to form graphene oxide. The step of functionalizing the graphene and/or graphene oxide can include treating the graphene and/or graphene oxide with a polycation or a polyanion. The polycation can be poly(ethyleneimine) (PEI), polydiallykdimethylammonium chloride (polyDADMAC), linear N, N-dodecyl, methyl-poly(ethyleneimine) (DMLPEI), poly (allylamine hydrochloride) (PAH), poly(N-methyl-ammonium iodide methylamine), polyamino(ethylvinylether) hydrochloride and any combination(s) thereof.

The polyanion can be poly (styrene sulfonate), polyacrylic acid, polystyrene sulfonate and their salts, polymethacrylic acids and their salts, poly(dodecyl sulphonate), polydodecylbenzenesulfonate, and any combination(s) thereof.

Uses of the Hybrid Nanomaterials and Composite Materials Containing the Hybrid Nanomaterials The hybrid nanomaterials and/or composite materials described herein can have high thermal conductivity. As used in the context of thermal conductivity, the term "high" can refer to at least 10 W/mK. The hybrid nanomaterials and/or composite materials described herein can have high electrical insulating properties. As used in the context of insulating properties, the term "high" can refer to a value greater than about $10^6$ ohm/cm. The hybrid nanomaterials and/or composite materials described herein can have thermal stability greater than about 100° C. The hybrid nanomaterials and/or composite materials described herein can have a low and/or customizable thermal expansion coefficient. As used in the context of the thermal expansion coefficient, the term "low" can refer to a value of $\alpha=1$ to $2$ to $1\times10^6$. The thermal expansion coefficient can be customizable in that it can be varied as desired based on the material composition of the hybrid nanomaterial. The hybrid nanomaterials and/or composite materials described herein can have a low density due to the inclusion of carbon based materials. The density of nanodiamond can be between 0.3 to 0.7 gm/cm$^3$. The density of graphene can be 0.02-0.07 g/cm$^3$. Thus, the density of the hybrid material can be between 0.302 to 0.7 gm/cm$^3$. The hybrid nanomaterials and/or composite materials described herein can have weak temperature dependence properties. As used in this context, the term "weak" can refer to the characteristic of the hybrid nanomaterial in that it will not show temperature dependency due to the insulating properties of the material. The hybrid nanomaterials and/or composite materials can have a reduced thermal stress and/or reduce the thermal stress in devices that that are incorporated with. The hybrid nanomaterials and/or composite materials can be a cost-effective alternative to currently available materials. The hybrid nanomaterials and/or composite materials can be used to increase the thermal conductivity of a polymer. The hybrid nanomaterials and/or composite materials can be used to increase the thermal conductivity of a polymeric material.

As described elsewhere herein, the hybrid nanomaterials can be combined with a polymer or polymeric material and serve as a filler material for the polymer or polymeric material. This is also referred to herein as a composite material. The hybrid nanomaterials and/or composite materials described herein can be incorporated into a device, device component, and systems. The hybrid nanomaterials and/or composite materials described herein can be used for many applications. They can be used in applications, systems, and devices where it is desired to include an electrically insulating material. They can be used to improve thermal management of systems and devices. Example applications include, but are not limited to, various electronics applications (e.g. high-power electronic systems and applications), hardware, interface, substrates, computers, HVAC industries, food industry, heat exchangers, aerospace industries, batteries, single chip package, electronic packaging, LED devices, 3D chip stack assembly and packaging, automotive industry electronic control units, and renewable energy technologies.

EXAMPLES

Now having described the embodiments of the present disclosure, in general, the following Examples describe some additional embodiments of the present disclosure. While embodiments of the present disclosure are described in connection with the following examples and the corresponding text and figures, there is no intent to limit embodiments of the present disclosure to this description. On the contrary, the intent is to cover all alternatives, modifications, and equivalents included within the spirit and scope of embodiments of the present disclosure.

Example 1

Introduction

Thermal management is one of the most important considerations for high power systems. The thermal management is very important for electronics at power-dense regions which produce "hot spots"—regions with wide temperature differences. The reliability of these electronics greatly depends on the heat dissipation of these hot spot regions. So, the composite polymer (epoxy, adhesive, etc.) have heat spreading capabilities which are more efficient in order to minimize the severity and influence of these hot spots in electronics packaging systems (1). Polymers such as liquid crystal polymer (LCP), polyphenylene sulfide (PPS), polyether ether ketone (PEEK polysulfones., polyimide (PI), acrylonitrile butadiene styrene (ABS), polybutylene terephthalate (PBT), polycarbonate, nylon, polypropylene (PP), and polystyrene (PS) thermal plastic polymers, have low thermal conductivity so these require a filler with high thermal conducting values for enhancing the thermal conductivity of any composite polymeric material. The interfacial thermal conductance between polymer and fillers are a critical consideration in management of thermal transport in the composite materials (2). The use of carbon nanotubes, carbon fibers and graphene as filler materials has been found to enhance the thermal and electrical conducting properties of thermal polymer. However, the functionalization is one of the key factors to enhance the thermal conductivity in graphene/polymer, carbon nanotube/polymer; graphene/boron nitride laminated composite, boron nitride nanosheets/polymer films etc. (2-4). The carbon nanotube having high thermal conductivity in addition as filler into the polymer could not enhance thermal conductivity of the composite due to poor coupling to the matrix material or to the contact surface (5). The thermal boundary resistance of the polymer matrix with carbon nanotubes has been found to as high as $10^{-7}$ m$^2$ K/W (5, 6). Thus, the chemical functionalization of filler also increases the magnitude of thermal conductivity of the composite materials (7). The thermal conductivity of graphene is in the range of around 3000 W/mK, and has been extensively used with polymer (polystyrene, epoxy resin etc.) to form composite, however it also increases the electrical conductivity up to 0.1 S/cm of the composite material (8).

The diamond promises one of the best materials for heat sink applications due to its thermal conductivity [up to 2,200 W/(m·K)], however, the heat sink properties have not been exploited due to the high cost on nanodiamonds (9). Nanodiamond (ND) which has been produced using the detonation technique has been proposed to show a high-level physical-mechanical and performance characteristics (10). The heat transfer properties of the nano-fluid containing nanodiamond has been shown in literature (11). Light emitting diode fixture designs have used nanodiamond thermal grease for the improved heat transfer purposes (12). The functionalization and composite formation of NDs with polymer is emerging rapidly due to electronic, mechanical and electrical properties. For example, Humberto et al have shown corrosion inhibitor characteristics of steel by composite film of made of nanodiamond-polyaniline (13). Ram et al have demonstrated novel photo electrochemical properties of nanohybrid films containing regioregular polyhexylthiophene (RRPHTh) conducting polymer with ND nanopartices (14, 15). The heat sink property of ND with thermal polymer has not been exploited so far.

Described in this Example are composite nanomaterials that can be composed of ND, graphene and/or graphene oxide, and a polymer. The composite nanomaterials can be electrically insulating and can be used for passive thermal management of high powered electronics. When the ND is combined with the graphene and/or graphene oxide in a polymer in the composite nanomaterial, the electrical conductivity can be inhibited or prevent the electrical conductivity and thus enhance the thermal conducting properties of the composite nanomaterial.

Briefly, ND can be functionalized. Graphene can be used to form graphene oxide. ND graphene and graphene oxide can be functionalized using a polyanion and/or polycation using a layer by layer technique. The functionalized ND and functionalized graphene as well as graphene oxide can be reacted to form a hybrid nanomaterial. The hybrid nanomaterial can then be used with a polymer, e.g. a polymer latex or epoxy, to form a composite nanomaterial. The physical properties (e.g. thermal, electrical, shrinkage, density change etc.) can be determined using measurement techniques known by one of ordinary skill in the art. FIG. 1 shows a schematic of the hybrid synthesized material, composites thereof, and uses thereof.

Functionalization of Nanodiamond, Graphene, and Graphene Oxide Nanomaterials.

Figure 2:
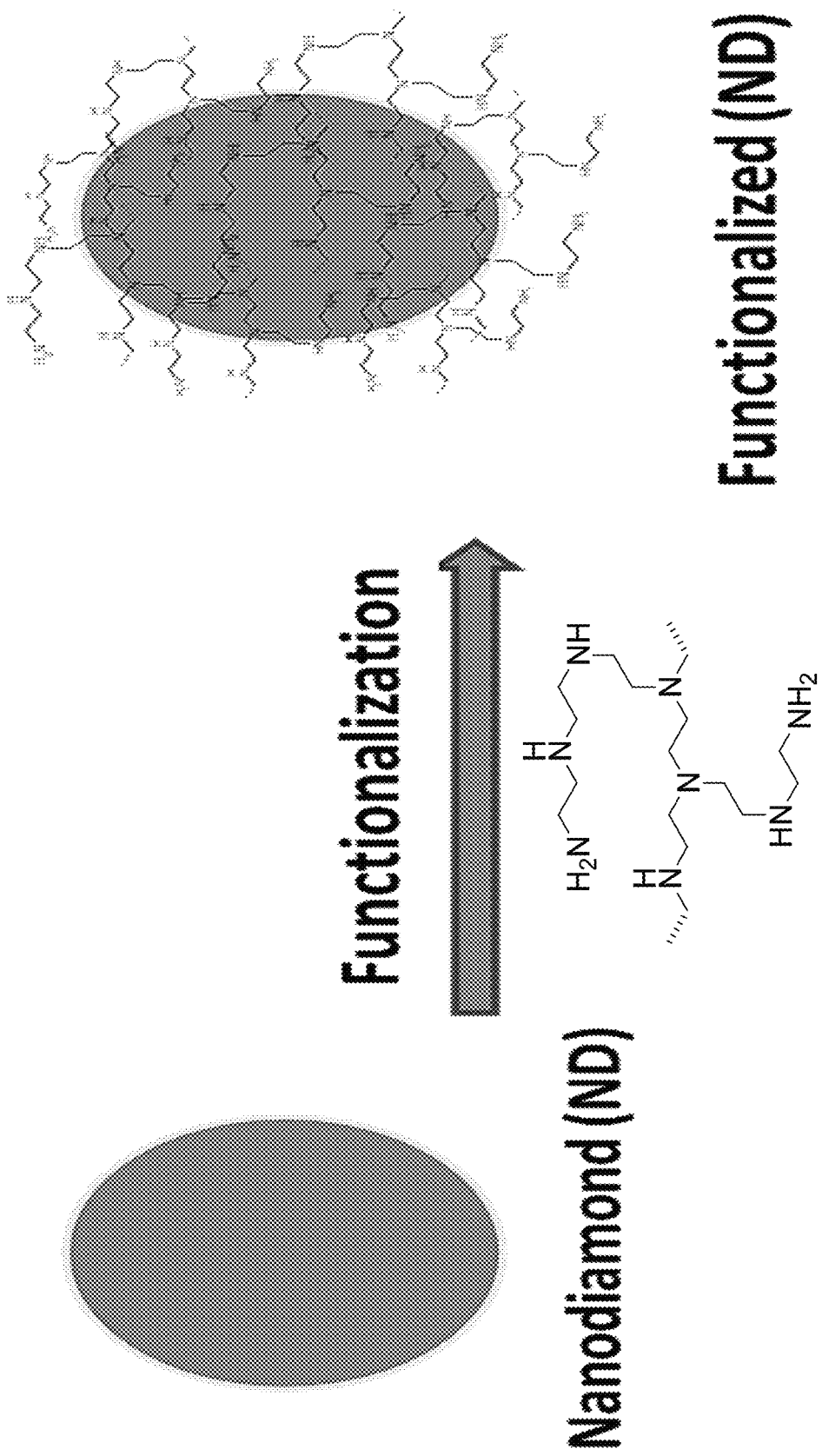
FIG. 2 shows a synthesis schematic to functionalize a nanodiamond using a polyanion.

ND produced by detonation methods contains a complex array of surface groups which allows tremendous functionalization capacity at the nanoscale level, especially with polymer, polyanion, polycations, and surfactant. Initially, a polycation such as polyethyleneimine can be functionalized with ND. The polyelectrolyte polyethyleneimine dissolved in water will be treated for 24 hr with ND, and later will be centrifuged and washed with water. The polyethyleneimine will have layer of coating over ND as shown in FIG. 2.

Functionalization of Graphene, and Graphene Oxide Nanomaterials

Figure 3:
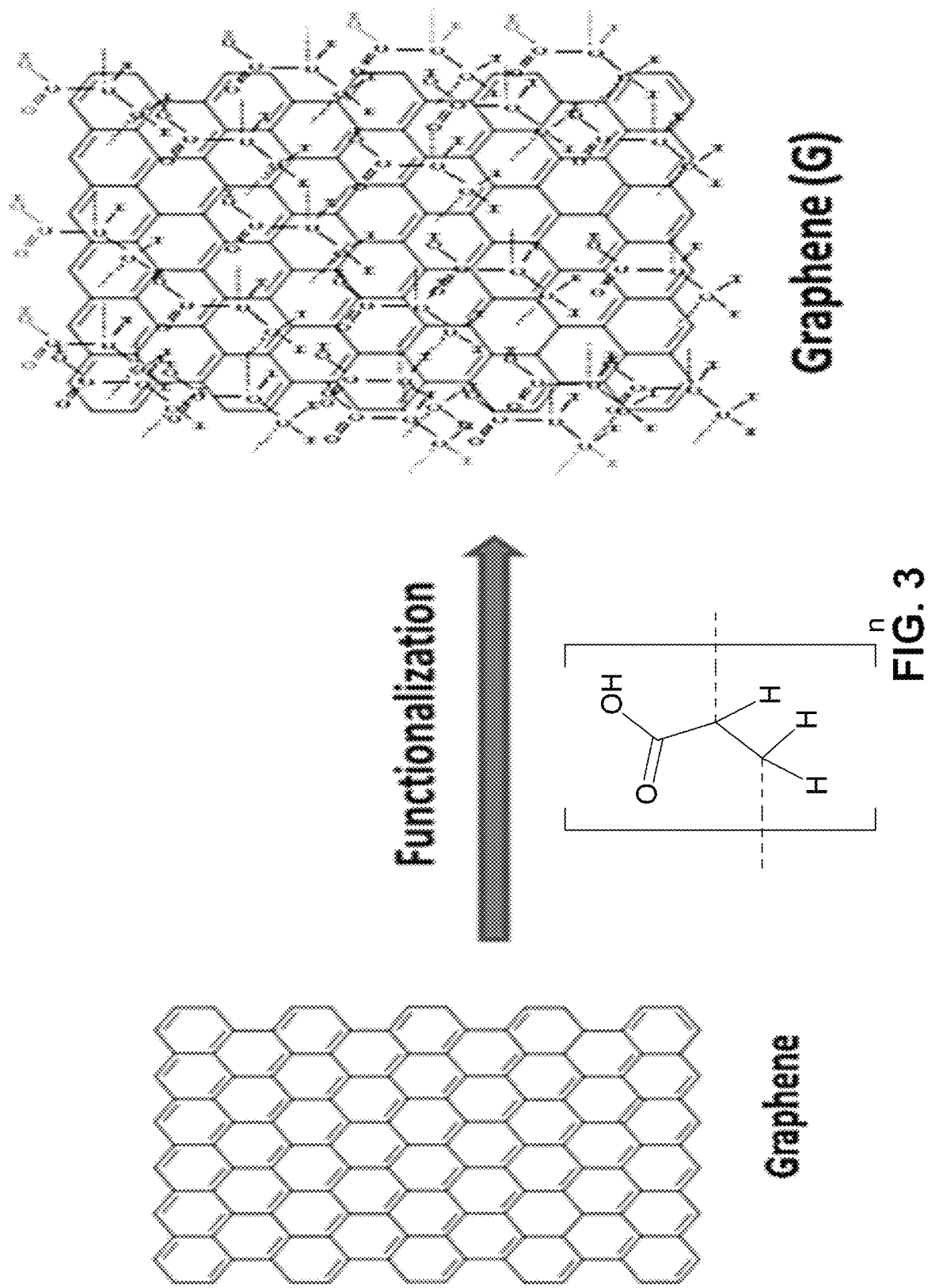
FIG. 3 shows a synthesis schematic to functionalize graphene using polycation.

Graphene can be treated with the solution of polycation electrolyte "polystyrene sulfonate (PSS)" for 24 hrs. One layer of polyanion PSS can be deposited over graphene nanomaterials. The un-deposited PSS polyanion can be cleaned by subsequent washing with water. FIG. 3 shows the schematic of functionalization of graphene with graphene oxide (GO) nanomaterial.

Figure 4:
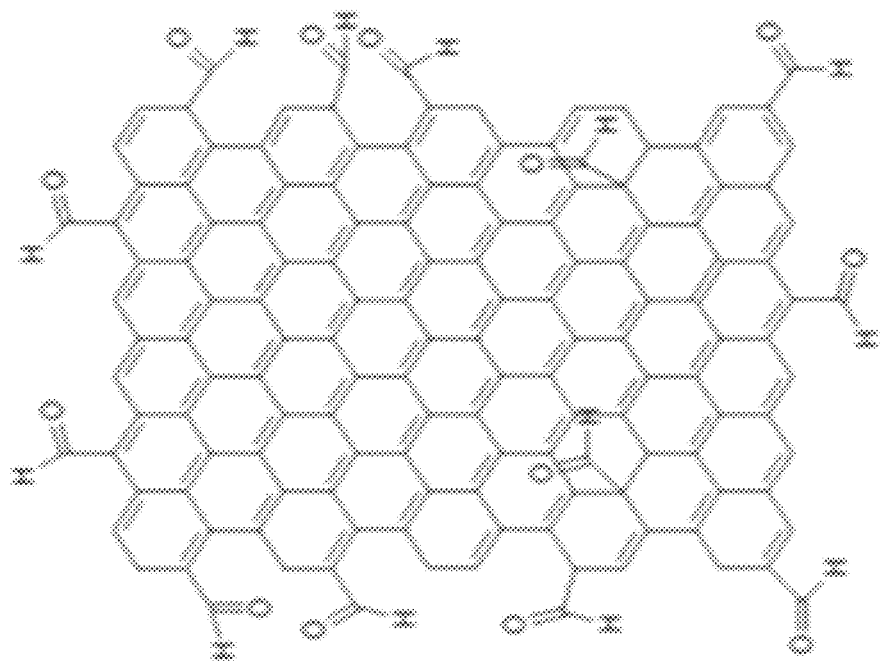
FIG. 4 shows a synthesis schematic to produce graphene oxide from graphene via an oxidation process.
Figure 4:
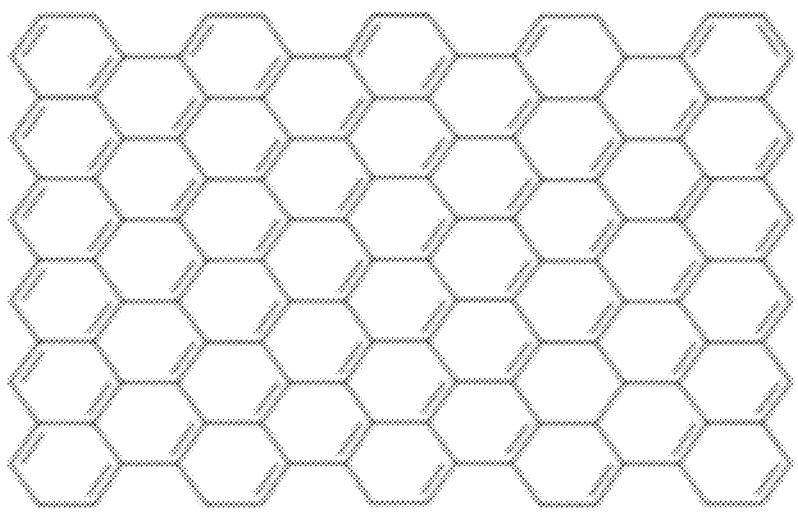
Figure 5:
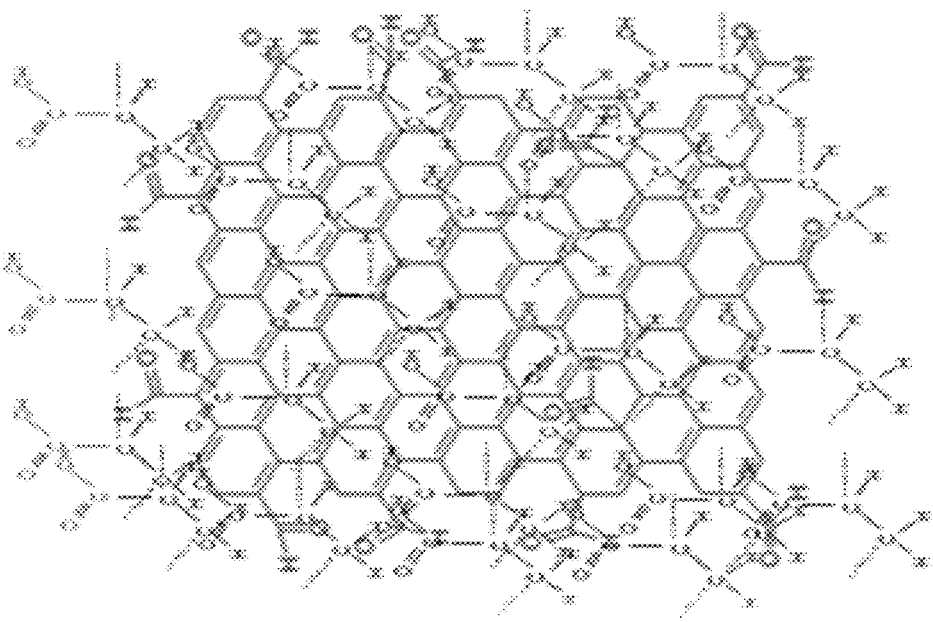
FIG. 5 shows a synthesis schematic to functionalize graphene using a polyanion.
Figure 5:
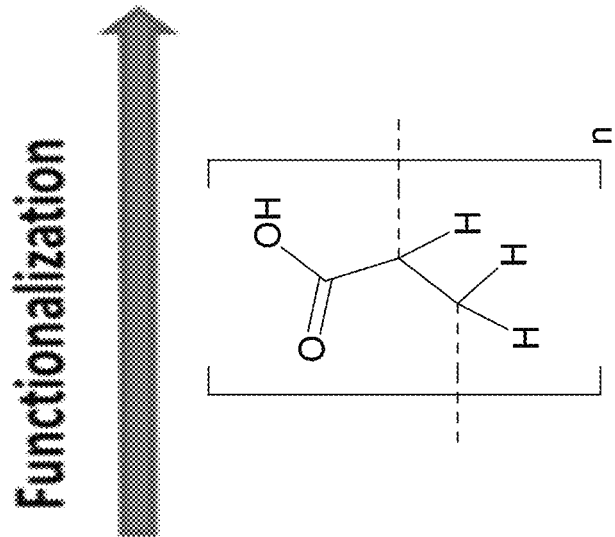
Figure 5:
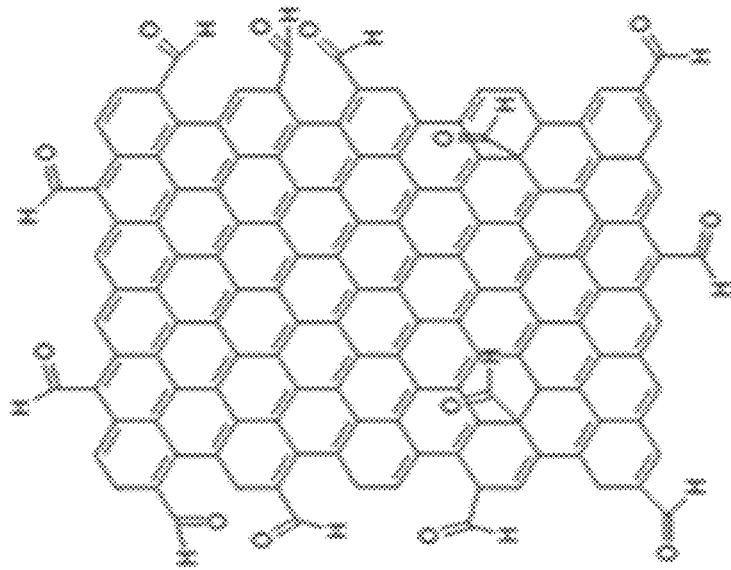

The commercially obtained graphene can be treated with concentrated sulfuric acid so that the graphene is oxidized to graphene oxide as well as the graphene is treated with oxygen at high temperature to form graphene to graphene oxide. The conductivity of the sample can be performed to understand the formation of GO. The schematic of carboxylation of graphene to graphene oxide is shown in FIG. 4. However, PSS can be deposited over GO similar to graphene, and an example schematic is shown in FIG. 5.

Synthesis of Hybrid Functionalized Nanomaterials.

Figure 6:
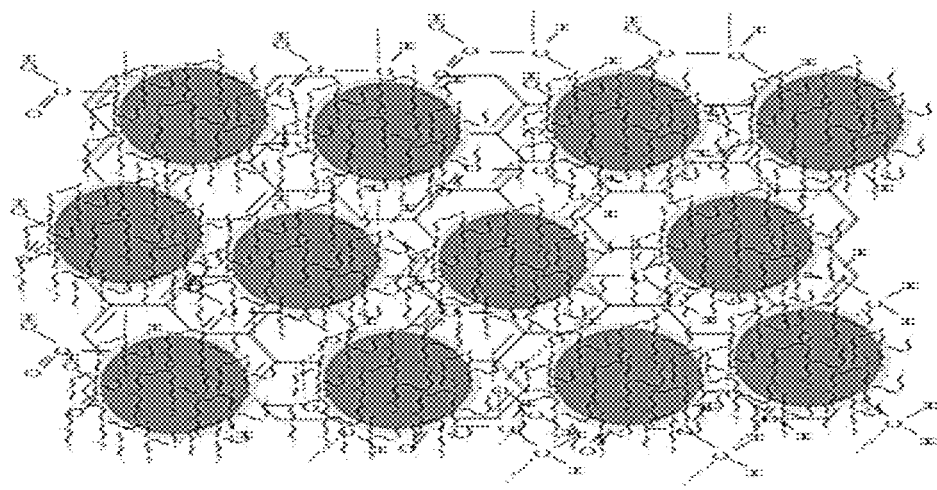
FIG. 6 shows a synthesis schematic to produce functionalized hybrid nanodiamond (ND)/graphene nanomaterial.
Figure 6:
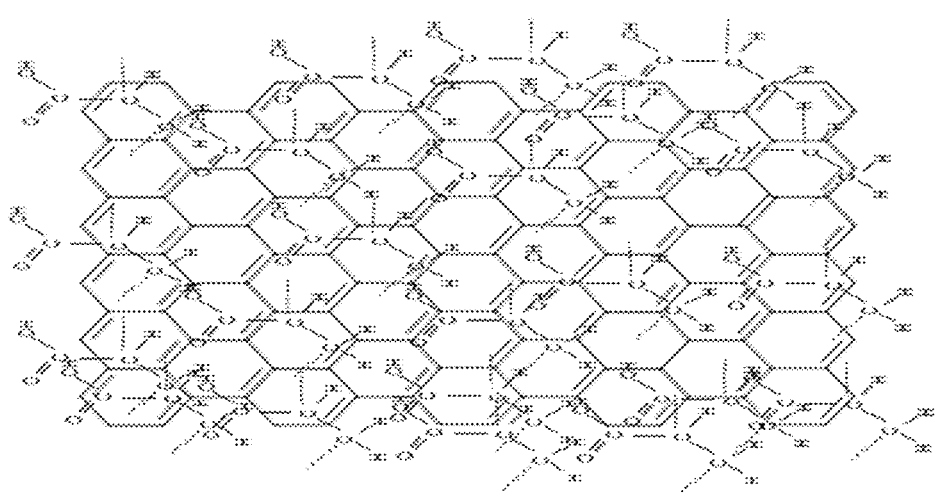
Figure 6:
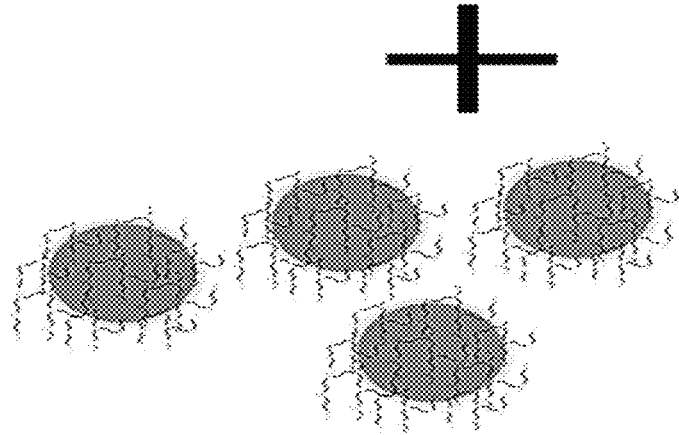
Figure 7:
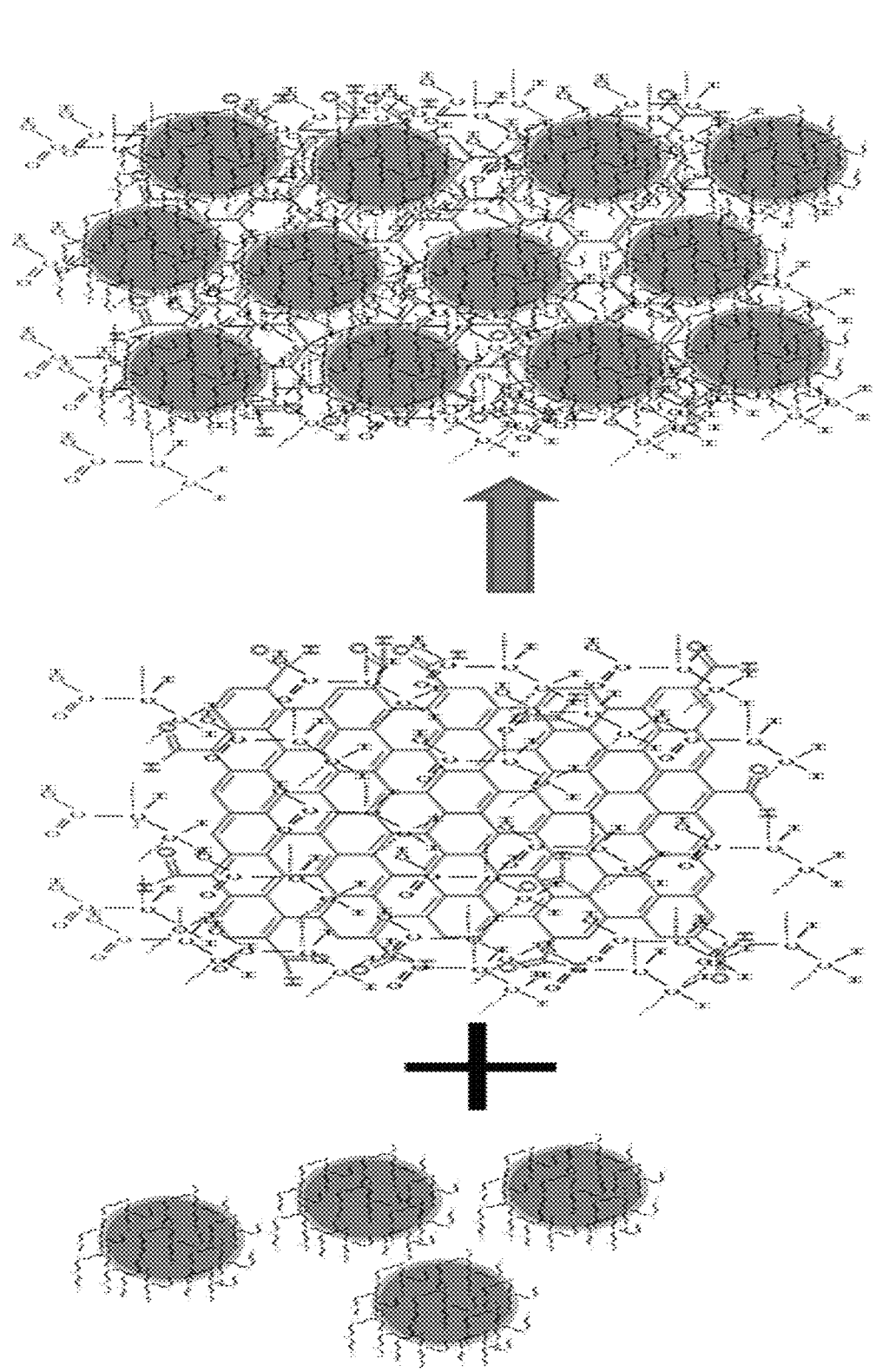
FIG. 7 shows a synthesis schematic to produce a functionalized hybrid nanodiamond (ND)/graphene oxide (GO) nanomaterial.

The functionalized ND, functionalized graphene (G) and functionalized graphene oxide (GO) materials can be used to synthesize PEI-ND-PSS-G and PEI-ND-PSS GO hybrid materials. The PEI-ND & PSS-G as well as PEI-ND & PSSGO separately can be mixed in an aqueous system for 10 to 12 hrs under slow and constant mixing conditions. There can be strong anion and cation interaction and PEI-ND-PSS-G PEI-ND-PSS-GO can be formed by electrostatic interaction of PSS and PEI. The solid material can be separated using a centrifuge, and can be dried at about 100° C. to remove any water contained in the resulted hybrid materials. The schematic of formation of PEI-ND-PSS-G and PEI-ND-PSS-GO are shown in FIGS. 6 and 7.

The microstructure and surface characterization of nanomaterials can be made using scanning electron microcopy (SEM) and Tunneling electron microscopy (TEM) techniques and structure and crystallinity can be tested using X-ray diffraction. The thermal properties of the hybrid material can be investigated using differential scanning calorimeter (DSC) and the functionalization in nanodiamond, graphene, graphene oxide and the hybrid nanomaterials can be investigated by Fourier transform infrared spectrophotometer (FTIR) technique. A two point probe can be used to measure the electrical conductivity and impedance studies in the samples.

The thermal conductivity of the sample will be studied using equation 1.

$$\alpha = k/\rho c_p \qquad \text{Eqn.1}$$

The thermal diffusivity is the ratio of thermal conductivity, k to the product of the density, $\rho$, and the heat capacity, $c_p$, of the substance—in this case. PEI-ND-PSS-G and PEI-ND-PSS-G O.

The thermal diffusivity can be measured via the laser flash method, using the Linseis XFA-500 laser flash analyzer (LFA) available at USF (subcontractor). The thermal diffusivity data displays inverse proportionality with absolute temperature, with the temperature dependence expressed as in equation 1. The emphasis can be given to run the sample below melting point. The data point can be taken the basis for an average, and thermal diffusivity of functionalized and hybrid materials can be calculated.

Fabrication of Composite Nanomaterials Using Adhesives and Pastes Containing Hybrid ND/Graphene and ND/GO Nanomaterials.

Figure 8:
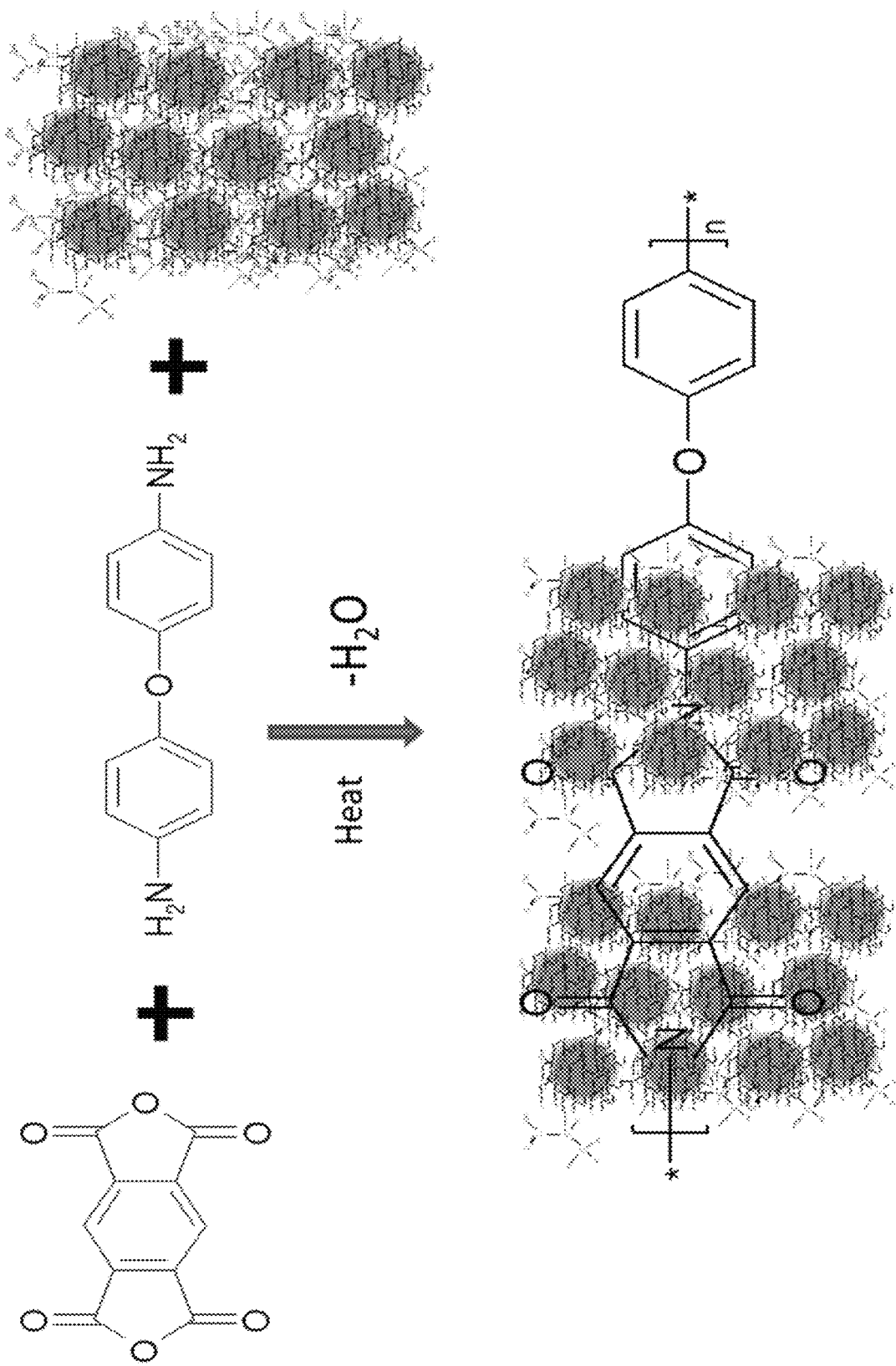
FIG. 8 shows a synthesis schematic to produce a polymer-functionalized ND-graphene hybrid nanomaterial nanocomposite.

Two thermal polymeric materials can be used to make the polymer composite material. For one, the synthetic path way as shown by DuPont de Nemours and Co. for polyimides preparation can be used (16). The processable polyamic acid from tetracarboxylic anhydrides and diaamines can undergo through imidization to convert into polyimide. The desired ratio of hybrid can be mixed with tetracarboxylic anhydrides and diaamines and the polymerized and cross linking reactions can be made under heating (16). FIG. 8 shows a schematic of polyimide-functional ND-graphene hybrid composite nanomaterial. There the ND-graphene hybrid and polymer can be mixed at different weight percentage to fabricate the thermal composite materials.

In the second fabrication, hybrid ND-GO with epoxy matrix understanding the thermal conducting path as the reinforcement can be generated, because the hybrid can have better thermal conductivity in the hybrid containing composite materials.

The physical and performance characteristics of the fabricated composite nanomaterials can be evaluated. The SEM, TEM, x-ray diffraction, FTIR methods can be used to evaluate the microscopic thermal and structural properties of the composite sample. The thermal diffusivity, thermal conductivity and electrical insulating of the sample can be measured. The random distributed nanomaterials in polymers shows wide hysteresis so the nanomaterials are oriented so the polymer will be aligned in electromagnetic field to align the nanohybrid in polymer and show enhanced and uniform thermal conductivity in the sample.

Thermal conductivity of the composite nanomaterials can be evaluated. Theoretical models can be developed to independently determine thermal and electrical conductivities of hybrid nanomaterials (functional ND/G, ND/GO, and polymer composites) developed and compared with experimental measurements. The composite conductivity can depend both on the individual conductivities and other properties of the matrix and the filler (can be computed using molecular dynamic simulation) as well as their volume fraction, morphology (dispersed individual particles, aggregates, fractal clusters, percolated network, etc.), anisotropy, and properties of filler-matrix interfaces. In order to accurately model these variations, the finite element method can be used to develop the model and to perform the simulations. The interfacial thermal resistance between matrix and filler can be also appropriately modeled. The contributions of different energy carriers (phonons, electrons, and photons) can be taken into account. The developed comprehensive model will can be used to further optimize the electrically insulating and thermally conducting properties of the hybrid composite material.

The generated hybrid composite nanomaterials can undergo optimization through MIL 883 standard and optimization process. The uniformity of thermal, electrical and environmental testing; manufacturing controls; and materials consistent quality and reliability for devices must be tested and optimized in agreement with standard set by DoD (17). Initially, the thermal conductivity of the sample can be estimated using MIL 883 standard of DOD method of standards, microelectronics. The thermal conductivity in watt/meter-K can be determined in accordance with ASTM C177 or ASTM C518. This standard MIL 883 can establish controls, and procedures for testing of microelectronic devices. The thermal shock, temperature cycling, mechanical shock, variable frequency vibration and constant acceleration can be tested accordance with (MIL-STD-883) standard.

REFERENCES FOR EXAMPLE 1

1. Moore A L, Shi L. Emerging challenges and materials for thermal management of electronics. Materials Today. 2014; 17(4):163-74.
2. Wang M, Galpaya D, Lai Z B, Xu Y, Yan C. Surface functionalization on the thermal conductivity of graphene-polymer nanocomposites. International Journal of Smart and Nano Materials. 2014; 5(2):123-32.
1. Moore A L, Shi L. Emerging challenges and materials for thermal management of electronics. Materials Today. 2014; 17(4):163-74.
2. Wang M, Galpaya D, Lai Z B, Xu Y, Yan C. Surface functionalization on the thermal conductivity of graphene-polymer nanocomposites. International Journal of Smart and Nano Materials. 2014; 5(2):123-32.
3. Su Z, Wang H, Ye X, Tian K, Huang W, Xiao C, et al. Enhanced thermal conductivity of functionalized-graphene/boron nitride flexible laminated composite adhesive via a facile latex approach. Composites Part A: Applied Science and Manufacturing. 2017; 99:166-75.
4. Wang J, Wu Y, Xue Y, Liu D, Wang X, Hu X, et al. Super-compatible functional boron nitride nanosheets/polymer films with excellent mechanical properties and ultra-high thermal conductivity for thermal management. Journal of Materials Chemistry C. 2018.
5. Shahil K M, Balandin A A. Thermal properties of graphene and multilayer graphene: Applications in thermal interface materials. Solid State Communications. 2012; 152(15):1331-40.
6. Huxtable S T, Cahill D G, Shenogin S, Xue L, Ozisik R, Barone P, et al. Interfacial heat flow in carbon nanotube suspensions. Nature materials. 2003; 2(11):731-4.
7. Shenogin S, Bodapati A, Xue L, Ozisik R, Keblinski P. Effect of chemical functionalization on thermal transport of carbon nanotube composites. Applied Physics Letters. 2004; 85(12):2229-31.
8. Stankovich S, Dikin D A, Dommett G H, Kohlhaas K M, Zimney E J, Stach E A, et al. Graphene-based composite materials. nature. 2006; 442(7100):282-6.
9. Kidalov S V, Shakhov F M. Thermal conductivity of diamond composites. Materials. 2009; 2(4):2467-95.
10. Vityaz P, Senyut V. Compaction of nanodiamonds produced under detonation conditions and properties of composite and polycrystalline materials made on their basis. Physics of the Solid State. 2004; 46(4):764-6.
11. Ghazvini M, Akhavan-Behabadi M, Rasouli E, Raisee M. Heat transfer properties of nanodiamond-engine oil nanofluid in laminar flow. Heat Transfer Engineering. 2012; 33(6):525-32.
12. Hochstein P A. LED thermal management. Google Patents; 2002.
13. Gomez H, Ram M K, Alvi F, Stefanakos E, Kumar A. Novel Synthesis, Characterization, and Corrosion Inhibition Properties of Nanodiamond-Polyaniline Films. The Journal of Physical Chemistry C. 2010; 114(44):18797-804.
14. Ram M K, Gomez H, A M F, Stefanakos E, Goswami Y, Kumar A. Novel nanohybrid structured regioregular polyhexylthiophene blend films for photoelectrochemical energy applications. The Journal of Physical Chemistry C. 2011; 115(44):21987-95.
15. Ram M K, Kumar A. Nano-hybrid structured regioregular polyhexylthiophene (RRPHTh) blend films for production of photoelectrochemical energy. Google Patents; 2016.
16. Molis S. Polyimides: Materials, Chemistry and Characterization. edited by C Feger et al, Elsevier Science Publisher, Amsterdam. 1989.
17. Department of Defense, Test Methods Standards, Microelectronics. In: Defense Do, editor. AMSC N/A FSC 59621997. p. 1-641.

Example 4

Synthesis of ND/PSS Particles

ND/PSS: Initially, functionalization of nanodiamond (ND) was made using standard temperature pressure (STP) condition. 2 mg/ml of polyanion 'polystyrene sulfonate (PSS)' was prepared. Later, 250 mg of ND was added in 2 mg/ml solution of 200 ml of PSS. The resulting solution was sonicated for 10 mins with power output of 400 W, and a frequency of 20 kHz. The solution was stirred for 12 hrs. The particles were centrifuged and washed 3-5 times for obtaining the ND/PSS particles.

Example 5

Synthesis of ND/PEI Particles

ND/PEI: 2 mg/ml solution of 1 liter was prepared using polycation polyethyleneimine (PEI) in deionized water. 250 mg of ND was added into 200 ml of 2 mg/ml solution of PEI. The solution was stirred for 30 minutes followed by 10 min of ultra-sonication with power output of 400 W and frequency of 20 kHz. The solution was stirred for 12 hrs. and cleaned through centrifugation for 3-5 times of washing with water.

Example 6

Synthesis of G/PSS Particles

G/PSS: 2 mg/ml of PSS solution was similarly made, and 250 mg of graphene (G) was added in the 200 ml solution. The G/PSS was obtained using similar procedure as discussed for obtaining ND/PSS particles.

Example 7

Synthesis of GO/PEI Particles

GO/PEI: The nano-particles were made by addition of 62.5 ml of 4 mg/ml of graphene oxide (GO) in 200 polycation polyethyleneimine (PEI) solution having concentration of 2 mg/ml. The GO/PEI was obtained using the similar process of G/PEI particles.

Example 7

Synthesis of ND/PSS/PEI/G Hybrid Particles
ND/PSS/PEI/G:

The ND/PSS particles and G/PEI particles were mixed in 200 ml of water, and stirred for 10 minutes. The ultrasonication was made where the attached ND/PSS and G/PEI particles was stirred for 12 hrs., the solution was heated for 50° C., cleaned using centrifuged with successive cleaning with water for three to four times.

Example 7

Synthesis of ND/PSS/PEI/GO Hybrid Particles
ND/PSS/PEI/GO:

The ND/PSS particles and GO/PEI particles were mixed in 200 ml of water and stirred for 10 minutes. The ultrasonication was made where the ND/PSS and PEI/GO particles attached was stirred for 12 hrs., the solution was heated for 50° C., cleaned using centrifuged with successive cleaning with water for three to four times.

Example 8

Preparation of Thermal Polymer:

The thermal polymer was prepared using epoxy with hybrid nanoparticles. The 4 ml araldite 502 was heated at 600° C. 4.4 ml of dodecenyl succinic anhydride (DDSA) was heated at 60° C. The araldite 502 and dodecenyl succinic anhydride (DDSA) was added and 0.2 ml of Benzyldimethylamine (BDMA) was mixed mechanically. Later, ND/G or ND/GO hybrid filler was added slowly and kept mixing for some time for equal dispersion. The mixture was placed in a mold and placed in oven at 60° C. for 12 hours.

0.1 to 10 wt. % of hybrid nanoparticles to epoxy ratio was made, and different thermal polymers were fabricated using various mold.

Figure 9:
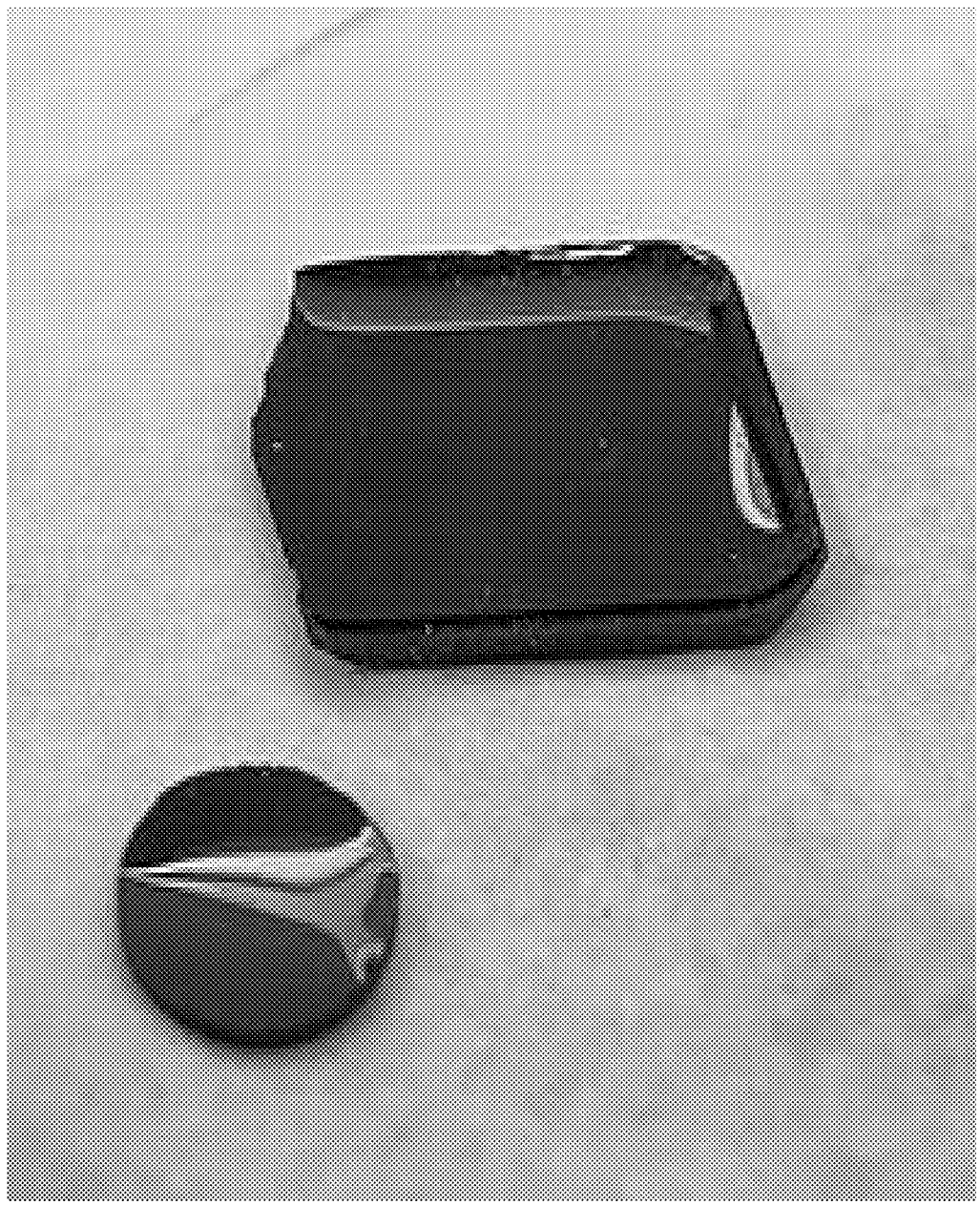
FIG. 9 is a photograph depicting an embodiment of a prepared thermal polymer using an embodiment of epoxy-ND/GO hybrid nanomaterial as described herein.

Results:

FIG. 9 is a photograph of the prepared thermal polymer of the present example using epoxy-ND/GO hybrid nanomaterial.

The thermal conductivity (k) of the thermal polymer was calculated using equation (2) below:

$$k = d * \alpha * Cp \qquad \text{Eqn.2}$$

where k=thermal conductivity, d=density, Cp=specific heat capacity and α=thermal diffusivity Thermal conductivity was measured to be from 0.1 mW/K to 7 mW/K using 0.1 to 10% hybrid nanoparticles to epoxy polymer.

Unless defined otherwise, all technical and scientific terms used herein have the same meanings as commonly understood by one of skill in the art to which the disclosed invention belongs. Publications cited herein and the materials for which they are cited are specifically incorporated by reference.

Those skilled in the art will recognize, or be able to ascertain using no more than routine experimentation, many equivalents to the specific embodiments of the invention described herein. Such equivalents are intended to be encompassed by the following claims.

I claim:

1. A composition comprising:
 a hybrid nanoparticle composite comprising:
  a functionalized nanodiamond functionalized with a first plurality of cations or a first plurality of anions, and
  a functionalized graphene functionalized with a second plurality of cations or a second plurality of anions, functionalized graphene oxide with a second plurality of cations or a second plurality of anions, or both,
  wherein the first plurality of cations or first plurality of anions are opposite in electrostatic charge than the second plurality of cations or second plurality of anions;
  wherein the functionalized nanodiamond and functionalized graphene, functionalized graphene oxide, or both, are attached via electrostatic interactions; and
 a polymer, wherein the polymer is attached to the hybrid nanoparticle composite; and
  wherein the composition is a paste.

2. The composition of claim 1 wherein the polymer is selected from the group consisting of: low density polyethylene, high density polytetrafluoroethylene, polyvinyl chloride, polyethylene, polypropylene, poly(methyl methacrylate), acrylonitrile butadiene styrene polystyrenes, nylon, nylon 6, nylon 6,6, a polyamide, polyether ketone, a polysulfone, polylactic acid, a polyimide, a silicon polymer, a thermoplastic polyurethane, Poly-[2,2'-(m-phenylene)-5,5'-bisbenzimidazole]), a polycarbonate, a polyether sulfone, a fluoropolymer, polyoxymethylene, polyetheimide, polyphenylene oxide, silicon rubber, polyimide, polyamide, copolymers thereof, and any combination thereof.

3. The composition of claim 1, wherein the first plurality and second plurality of cations are selected from the group consisting of: poly(ethyleneimine) (PET), polydiallyldimethylammonium chloride (polyDADMAC), linear N, N-dodecyl, methyl-poly(ethyleneimine) (DMLPEI), poly (allylamine hydrochloride) (PAH), poly(N-methyl-ammonium iodide methylamine), polyamino(ethylvinylether) hydrochloride and combination(s) thereof.

4. The composition of claim 1, wherein the second plurality of anions are selected from the group consisting of poly (styrene sulfonate), polyacrylic acid, polystyrene sulfonate and their salts, polymethacrylic acids and their salts, poly(dodecyl sulphonate), polydodecylbenzenesulfonate, and combinations thereof.

5. The composition of claim 1, wherein when the functionalized graphene, functionalized graphene oxide, or both includes functionalized graphene oxide,
the functionalized graphene oxide is functionalized with a second plurality of anions.

6. The composition of claim 5, wherein the second plurality of anion, is selected from the group consisting of poly (styrene sulfonate), polyacrylic acid, polystyrene sulfonate and their salts, polymethacrylic acids and their salts, poly(dodecyl sulphonate), polydodecylbenzenesulfonate, and combinations thereof.

7. The composition of claim 1, wherein the composition forms a sheet.

8. The composition of claim 7, wherein the sheet has a thickness of about 1 µm to about 2500 µm.

9. The composition of claim 7, wherein the sheet has a surface area of at least 1 $cm^2$ to 100 $cm^2$.

10. A method comprising:
functionalizing a nanodiamond with a first plurality of anions or a first plurality of cations to form a functionalized nanodiamond;
functionalizing graphene with a second plurality of anions or a second plurality of cations or functionalizing graphene oxide with a second plurality of anions or a second plurality of cations to form a functionalized graphene or functionalized graphene oxide;
wherein the first plurality of cations or first plurality of anions are opposite in electrostatic charge than the second plurality of cations or second plurality of anions;
electrostatically interacting the functionalized nanodiamond and the functionalized graphene or functionalized graphene oxide to form a hybrid nanoparticle; and
reacting the hybrid nanomaterial with a polymer to form a composite nanomaterial configured as a paste.

11. The method of claim 10, wherein the polymer is selected from the group consisting of: low density polyethylene, high density polytetrafluoroethylene, polyvinyl chloride, polyethylene, polypropylene, poly(methyl methacrylate) (PMMA), acrylonitrile butadiene styrene polystyrenes, nylon, nylon 6, nylon 6,6, a polyamide, polyether ketone, a polysulfone, polylactic acid, a polyimide, a silicon polymer, a thermoplastic polyurethane, Poly-[2,2'-(m-phenylene)-5,5'-bisbenzimidazole]), a polycarbonate, a polyether sulfone, a fluoropolymer, polyoxymethylene, polyetheimide, polyphenylene oxide, silicon rubber, polyimide, polyamide, copolymers thereof, and any combination thereof.

12. The method of claim 10, wherein the first plurality and second plurality of cations are selected from the group consisting of: poly(ethyleneimine) (PEI), polydiallyldimethylammonium chloride (polyDADMAC), linear N, N-dodecyl, methyl-poly(ethyleneimine) (DMLPEI), poly (allylamine hydrochloride) (PAH), poly(N-methyl-ammonium iodide methylamine), polyamino(ethylvinylether) hydrochloride and combination(s) thereof and the first plurality and second plurality of anions are selected from the group consisting of poly (styrene sulfonate), polyacrylic acid, polystyrene sulfonate and their salts, polymethacrylic acids and their salts, poly(dodecyl sulphonate), polydodecylbenzenesulfonate, and combinations thereof.

* * * * *